(12) United States Patent
Okajima et al.

(10) Patent No.: US 11,493,413 B2
(45) Date of Patent: Nov. 8, 2022

(54) TESTING METHOD AND TEST PIECE OF THERMAL BARRIER COATING

(71) Applicant: MITSUBISHI HEAVY INDUSTRIES, LTD., Tokyo (JP)

(72) Inventors: Yoshifumi Okajima, Tokyo (JP); Taiji Torigoe, Tokyo (JP); Hiroshi Ishikawa, Tokyo (JP); Hitoshi Tamaki, Tokyo (JP); Kazuma Takeno, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 702 days.

(21) Appl. No.: 16/473,337

(22) PCT Filed: Dec. 26, 2017

(86) PCT No.: PCT/JP2017/046686
§ 371 (c)(1),
(2) Date: Jun. 25, 2019

(87) PCT Pub. No.: WO2018/124086
PCT Pub. Date: Jul. 5, 2018

(65) Prior Publication Data
US 2020/0141847 A1    May 7, 2020

(30) Foreign Application Priority Data
Dec. 26, 2016   (JP) .............................. JP2016-251455

(51) Int. Cl.
*G01N 3/08* (2006.01)
*G01N 1/28* (2006.01)

(52) U.S. Cl.
CPC ............... *G01N 3/08* (2013.01); *G01N 1/286* (2013.01); *G01N 2001/2873* (2013.01)

(58) Field of Classification Search
USPC .......................................................... 73/818
See application file for complete search history.

(56) References Cited

U.S. PATENT DOCUMENTS 9,989,450 B2 *    6/2018   Kudo ....................... G01N 3/56
2012/0328366 A1 * 12/2012  Jarmon .................... F23R 3/60
                                                       403/376

FOREIGN PATENT DOCUMENTS

CN        201355331     12/2009
JP        60-61644      4/1985
                (Continued)

OTHER PUBLICATIONS

Office Action dated Apr. 25, 2021 in Chinese Patent Application No. 201780079867.2, with English-language translation.
(Continued)

*Primary Examiner* — Clayton E. La Balle
*Assistant Examiner* — Warren K Fenwick
(74) *Attorney, Agent, or Firm* — Wenderoth, Lind & Ponack, LLP

(57) ABSTRACT

A testing method of thermal barrier coating (TBC) is for evaluating the presence or absence of damage to TBC formed on a bending part on which compression stress acts. The method includes a test piece that includes a pair of arm parts, a bending part arranged between the pair of arm parts, and a TBC layer on a bending surface of the bending part; attaching the test piece to a compression testing device after preparing the test piece; and applying compression stress to the test piece in a direction for bringing the pair of arm parts close together after attaching the test piece with the compression testing device. The pair of arm parts are arranged so as to separate from each other from base end portions toward front end portions of the arm parts. The bending part is arranged between the base end portions.

10 Claims, 9 Drawing Sheets

(56) References Cited

FOREIGN PATENT DOCUMENTS

| | | |
|---|---|---|
| JP | 2001-330542 | 11/2001 |
| JP | 2004-12390 | 1/2004 |
| JP | 2004-184238 | 7/2004 |
| JP | 2004184238 A * | 7/2004 |
| JP | 2004-309217 | 11/2004 |

OTHER PUBLICATIONS

International Search Report dated Feb. 20, 2018 in International (PCT) Application No. PCT/JP2017/046686, with English translation.

Written Opinion of the International Searching Authority dated Feb. 20, 2018 in International (PCT) Application No. PCT/JP2017/046686, with English translation.

* cited by examiner

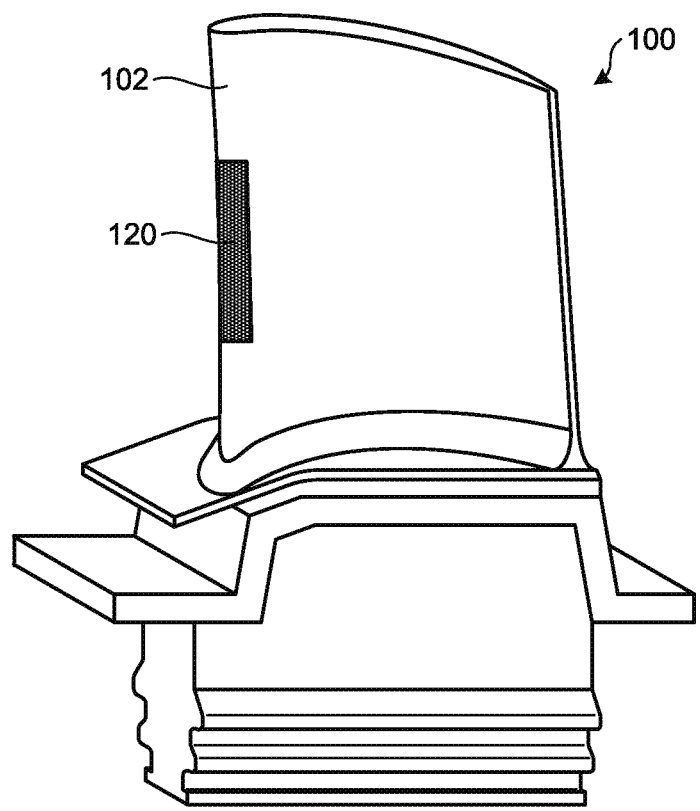
FIG.9 - PRIOR ART

FIG.10 - PRIOR ART
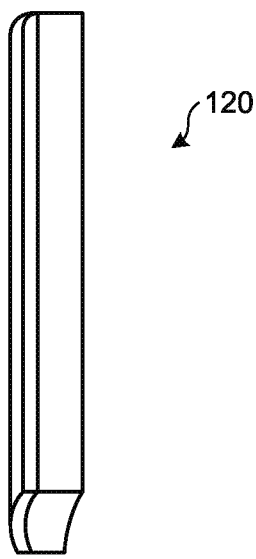
FIG.11 - PRIOR ART
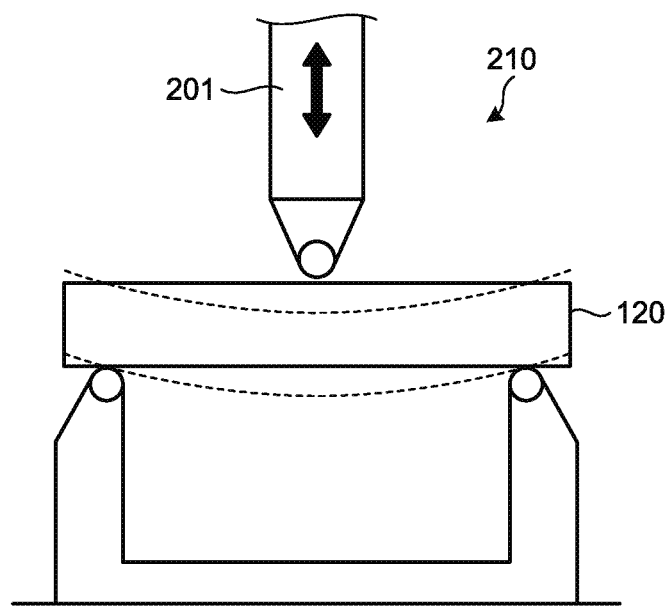

TESTING METHOD AND TEST PIECE OF THERMAL BARRIER COATING

FIELD

The present invention relates to a testing method and a test piece of thermal barrier coating for evaluating the presence or absence of damage to thermal barrier coating formed on a bending part on which compression stress acts.

BACKGROUND

A thermal barrier coating (TBC) layer is formed on, for example, a surface of a blade of a gas turbine, a member of a combustor, and the like, in order to improve thermal barrier property and durability. Because a TBC layer is exposed to high temperature surroundings for a long time, the TBC layer is likely to be damaged. If a TBC layer is damaged, a base material below the TBC layer is likely to be damaged. Therefore, there have been known a method and a device for evaluating a member including a TBC layer (for example, see Japanese Patent Application Laid-open No. 2001-330542, hereinafter JP '542.

In a technique disclosed in JP '542, a test piece is obtained from a portion where fatigue damage has developed most and cracks have extended in a turbine blade serving as a real machine. A test piece has a bar-like shape that goes along with a leading edge of a turbine blade and extends in a radial direction. A bending load is repeatedly applied to a test piece along a direction perpendicular to an axis direction of the test piece. In this manner, in the technique disclosed in JP '542, stress is applied to a test piece that does not include a bending part.

Because high compression stress acts on bending parts of a blade of a gas turbine and a member of a combustor than any other parts, the bending parts are required to appropriately evaluate quality of a TBC layer. Furthermore, application of TBC to bending parts is more difficult than application of TBC to any other parts, and it is difficult for the bending parts to keep quality of TBC uniform. For this reason, bending parts of a blade of a gas turbine and a member of a combustor are required to appropriately evaluate quality of a TBC layer. Thus, for TBC formed on bending parts on which compression stress acts, accurately evaluating presence or absence of damage is required.

SUMMARY OF THE INVENTION

In view of the foregoing, an object of the present invention is to provide a testing method and a test piece of TBC capable of accurately evaluating presence or absence of damage to TBC formed on a bending part on which compression stress acts.

Solution to Problem

A testing method of a thermal barrier coating (TBC) according to the present invention is a testing method of TBC for evaluating the presence or absence of damage to TBC formed on a bending part on which compression stress acts. The testing method of TBC includes a test piece preparation step of preparing a test piece that includes a pair of arm parts, a bending part arranged between the pair of arm parts, and a TBC layer on a bending surface of the bending part; an attachment step of attaching the test piece to a compression testing device after the test piece preparation step; and a stress application step of applying compression stress to the test piece in a direction for bringing the pair of arm parts close together after the attachment step with the compression testing device.

This method enables the presence or absence of damage to TBC formed on a bending part on which compression stress acts to be accurately evaluated.

In the testing method of TBC, the test piece preparation step includes forming a pair of round holes passing through the arm parts in a plate thickness direction of the pair of arm parts, the attachment step includes attaching the test piece to the compression testing device through pins inserted into the pair of round holes, and the stress application step includes applying compression stress to the test piece in a direction for bringing the pair of arm parts close together through the pins. This method enables influence of a bending moment to be reduced, and enables the presence or absence of damage to TBC formed on a bending part on which compression stress acts to be accurately evaluated.

In the testing method of TBC, at the test piece preparation step, a curvature radius R of the bending part is made within a range of a value of a curvature radius of a (second) bending part in a real machine to be evaluated, a thickness hc of the TBC layer is made within a range of a value of a thickness of a (second) TBC layer in the real machine, a thickness hs of the bending part is made within a range of a value of a thickness of the (second) bending part in the real machine, and a distance H between the center of the pair of round holes and the center of the curvature radius R is set at a value that is calculated based on the curvature radius R, the thickness hc, and the thickness hs. This method enables the presence or absence of damage to the TBC formed on a bending part on which compression stress acts to be accurately evaluated.

In the testing method of TBC, at the test piece preparation step, the curvature radius R is made within a range from 3 mm or more to 7 mm or less, the thickness hc is made within a range from 0.3 mm or more to 1.5 mm or less, and the thickness hs is made within a range from 3 mm or more to 7 mm or less. This method enables presence or absence of damage to TBC formed on a bending part on which compression stress acts to be accurately evaluated.

A test piece according to the present invention is a test piece that is used in a testing method of TBC for evaluating presence or absence of damage to TBC formed on a bending part on which compression stress acts. The test piece includes a pair of arm parts; a bending part that is arranged between the pair of arm parts; and a TBC layer on a bending surface of the bending part.

This configuration enables the presence or absence of damage to TBC formed on a bending part on which compression stress acts to be accurately evaluated.

In the test piece, a pair of round holes passing through the pair of arm parts in a plate thickness direction is included in the pair of arm parts, and the test piece is to be attached to a compression testing device through pins inserted into the pair of round holes. This configuration enables influence of a bending moment to be reduced, and enables presence or absence of damage to TBC formed on a bending part on which compression stress acts to be accurately evaluated.

In the test piece, a curvature radius R of the bending part is made within a range of a value of a curvature radius of a bending part in a real machine to be evaluated, a thickness hc of the TBC layer is made within a range of a value of a thickness of a TBC layer in the real machine, a thickness hs of the bending part is made within a range of a value of a thickness of a bending part in the real machine, and a distance H between the center of the pair of round holes and the center of the curvature radius R is set at a value that is calculated based on the curvature radius R, the thickness hc, and the thickness hs. This configuration enables presence or absence of damage to TBC formed on a bending part on which compression stress acts to be accurately evaluated.

In the test piece, the curvature radius R is made within a range from 3 to 7 mm, the thickness hc is made within a range from 0.3 to 1.5 mm, and the thickness hs is made within a range from 3 to 7 mm. This configuration enables presence or absence of damage to TBC formed on a bending part on which compression stress acts to be accurately evaluated.

According to the present invention, presence or absence of damage to thermal barrier coating (TBC) formed on a bending part on which compression stress acts can be accurately evaluated.

BRIEF DESCRIPTION OF DRAWINGS

FIG. 9 is a schematic view illustrating a conventional test piece.

FIG. 10 is a schematic view illustrating the conventional test piece.

FIG. 11 is a schematic view illustrating the conventional testing method.

DESCRIPTION OF EMBODIMENTS

Embodiments according to the present invention will now be described with reference to the accompanying drawings. It should be noted that the embodiments are not intended to limit this invention. Components in the following embodiments include components that can be replaced and are facilitated by the skilled person or substantially like components. Components described below can be combined as appropriate. When there are a plurality of the embodiments, each of the embodiments can be combined.

First Embodiment

Figure 1:
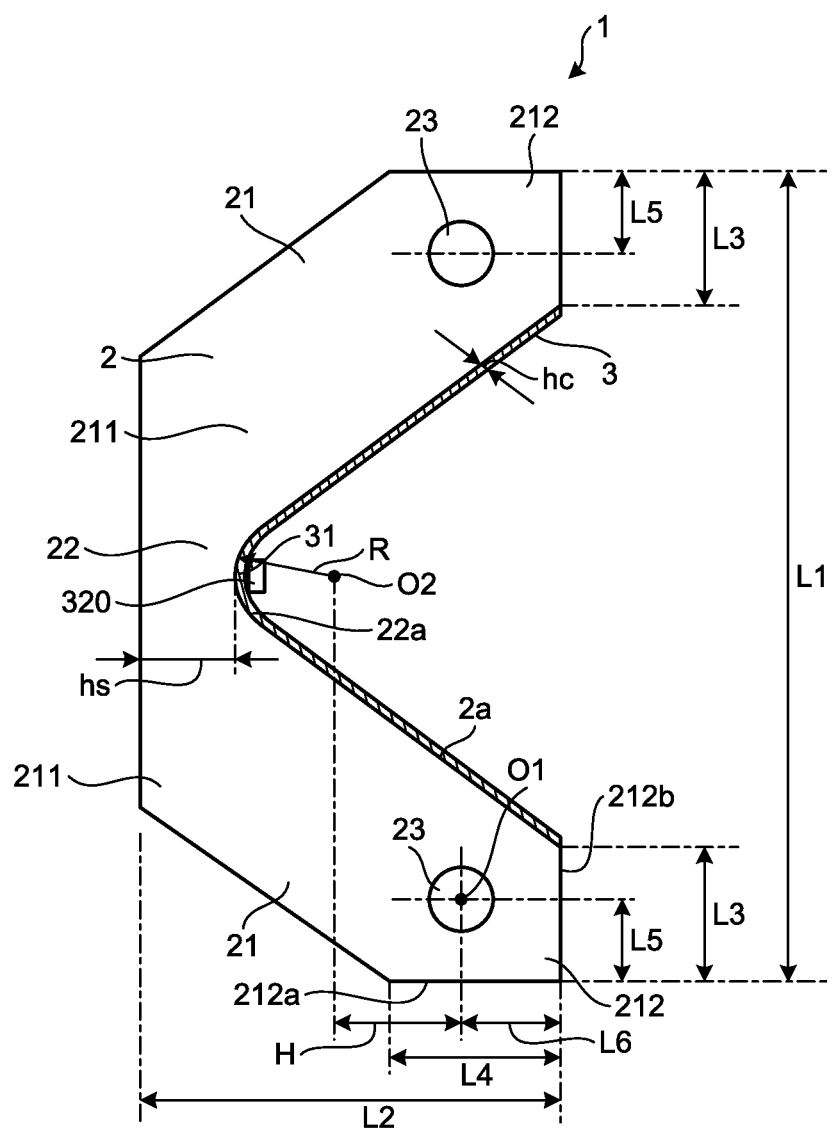
FIG. 1 is a front view illustrating an example of a test piece that is used in a testing method of thermal barrier coating (TBC) according to a first embodiment.

A test piece 1 is described with reference to FIG. 1. FIG. 1 is a front view illustrating an example of the test piece that is used in a testing method of thermal barrier coating (TBC) according to a first embodiment. The test piece 1 imitates a bending part 104 (see FIG. 7) that includes a range where high compression stress acts in a turbine blade 100 (see FIG. 7) of a gas turbine serving as a real machine to be evaluated.

The test piece 1 includes a main body part 2, and a thermal barrier coating (TBC) layer 3 that is formed on a surface of the main body part 2.

The main body part 2 is a base material of the test piece 1. The main body part 2 is formed of a heat-resistant alloy the same as a base material of a blade part 102 (see FIG. 7) in the turbine blade 100. The main body part 2 is cut out of a material ingot and is formed in a plate shape. The main body part 2 has a plate thickness to a degree that the main body part 2 is not unintendedly deformed when predetermined compression stress is applied to the main body part 2. It is preferable that a plate thickness of the main body part 2 be, for example, about 5 mm or more and 15 mm or less. The main body part 2 includes a pair of arm parts 21, a bending part 22, and a pair of round holes 23.

The pair of arm parts 21 are arranged to face each other. More specifically, the pair of arm parts 21 are arranged so as to separate from each other from base end portions 211 toward front end portions 212. The pair of arm parts 21 are formed into a shape so that the arm parts 21 are easily attached to a compression testing device 310 (see FIG. 3). The bending part 22 is arranged between the base end portions 211 of the pair of arm parts 21. The pair of arm parts 21 and the bending part 22 are integrally formed with each other.

The bending part 22 includes a bending surface 22a that bends in a curvature radius R. It is preferable that the curvature radius R of the bending part 22 together with a curvature radius of the bending part 104 of the turbine blade 100 of a gas turbine be made within a range from 3 mm or more to 7 mm or less. It is preferable that a thickness hs of the bending part 22 together with a thickness of the bending part 104 of the turbine blade 100 of a gas turbine be made within a range from 3 mm or more to 7 mm or less.

The pair of round holes 23 are formed by passing through the front end portions 212 of the pair of arm parts 21 in a plate thickness direction. The pair of round holes 23 are arranged to face each other. The round holes 23 have a diameter where pins 315 of the compression testing device 310 are slidably inserted. In the present embodiment, the diameter of the round holes 23 is 5.5 mm.

The TBC layer 3 protects the main body part 2 from a high temperature. The TBC layer 3 is formed as a film on the inner periphery 2a of the main body part 2. The TBC layer 3 is formed in the same way as the turbine blade 100 of a gas turbine is. In the TBC layer 3, a position corresponding to the bending surface 22a of the bending part 22 in the test piece 1 is referred to as a bending part 31.

It is preferable that a thickness hc of the TBC layer 3 together with a thickness of a TBC layer of the turbine blade 100 of a gas turbine be made within a range from 0.3 mm or more to 1.5 mm or less.

The TBC layer 3 is formed by forming a bond coat layer serving as a metal bonding layer on the inner periphery 2a of the main body part 2 and laminating a ceramic layer formed of oxide ceramics on the bond coat layer using a film forming method such as thermal spraying. A bond coat layer is, for example, an MCrAlY alloy (M represents cobalt (Co), nickel (Ni), or a combination thereof). A ceramic layer is a $ZrO_2$ material, for example, yttria-stabilize zirconia (YSZ) that is $ZrO_2$ partially or completely stabilized by $Y_2O_3$.

In the test piece 1 formed in this manner, a distance H between the center O1 of the pair of round holes 23 and the center O2 of the curvature radius R is a value that is calculated based on the curvature radius R of the bending part 22, the thickness hc of the TBC layer 3, and the thickness hs of the bending part 22. The distance H has a dimension allowing compression stress causing damage on the TBC layer 3 in a test and compression stress calculated about, for example, the bending part 104 in the turbine blade 100 of a gas turbine with finite element method (FEM) calculation to be covered and applied to the bending part 31 of the TBC layer 3.

Figure 2:
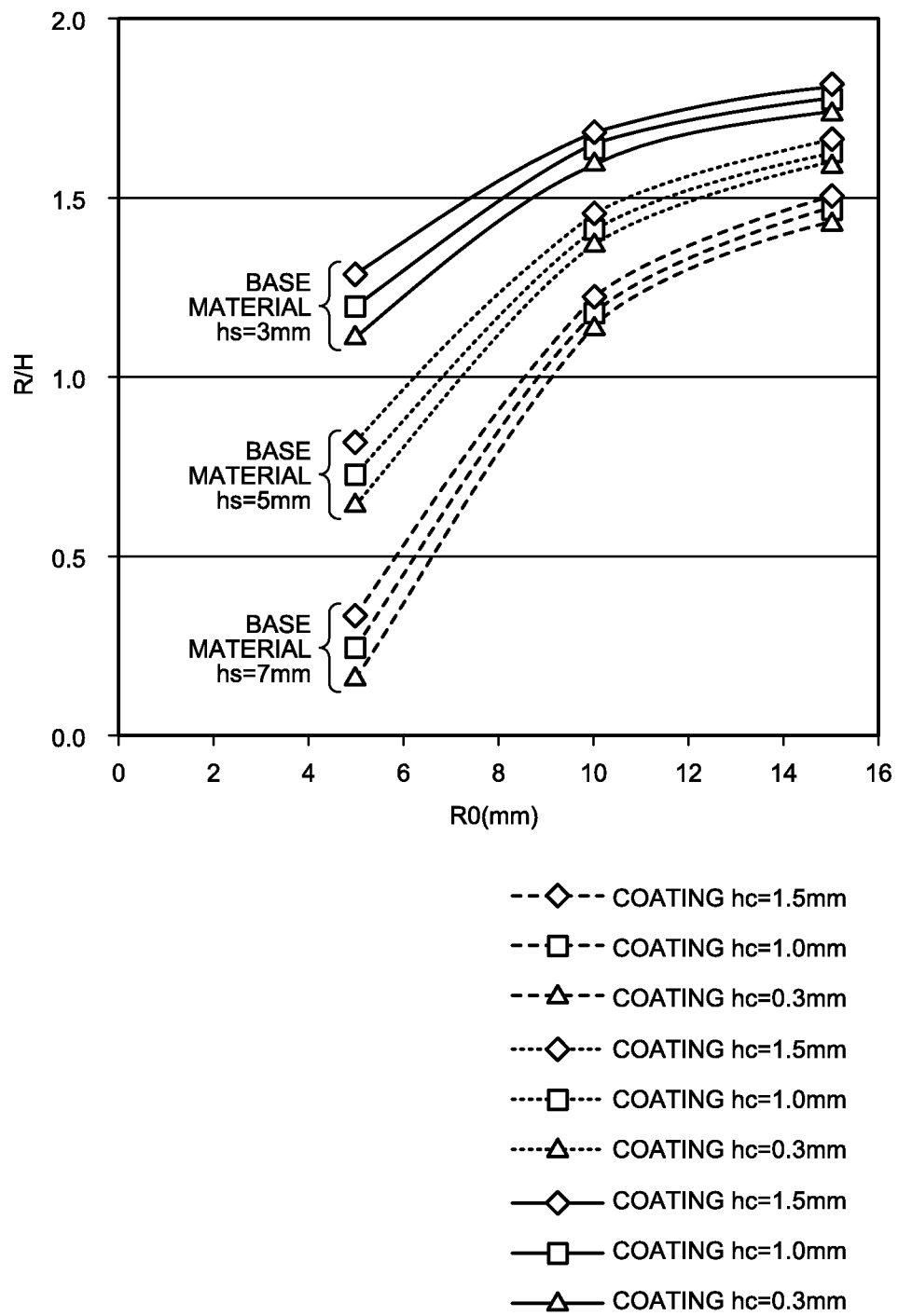
FIG. 2 is a graph illustrating a request range of a dimension of the test piece according to the first embodiment.

The following describes a method for calculating the distance H with reference to FIG. 2. FIG. 2 is a graph illustrating a request range of a dimension of the test piece according to the first embodiment. The graph illustrates, using a horizontal axis as a curvature radius R0 of the bending part 31 of the TBC layer 3 and using a vertical axis as the curvature radius R of the bending part 22/distance H, a request range of a dimension of the distance H when the thickness hc of the TBC layer 3 is changed for each thickness hs of the bending part 22. The graph illustrates, as an example, when the thickness hs of the bending part 22 is set at 3 mm, 5 mm, and 7 mm and the thickness hc of the TBC layer 3 is changed to 0.3 mm, 1.0 mm, and 1.5 mm for each thickness hs, a request range of a dimension of the distance H. The distance H may be equal to or greater than a value illustrated in the graph.

When the distance H is set at 85 mm in the present embodiment, the other dimension of the test piece 1 is as follows. A length L1 of a longitudinal direction of the main body part 2 is 700 mm. A length L2 of a lateral direction of the main body part 2 is 240 mm. A length L3 of a longitudinal direction of the front end portions 212 in the arm parts 21 is 115 mm. A length L4 of a lateral direction of the front end portions 212 in the arm parts 21 is 110 mm. A length L5 from end surfaces 212a of the front end portions 212 to the round holes 23 is 70 mm. A length L6 from end surfaces 212b of the front end portions 212 to the round holes 23 is 65 mm.

Figure 3:
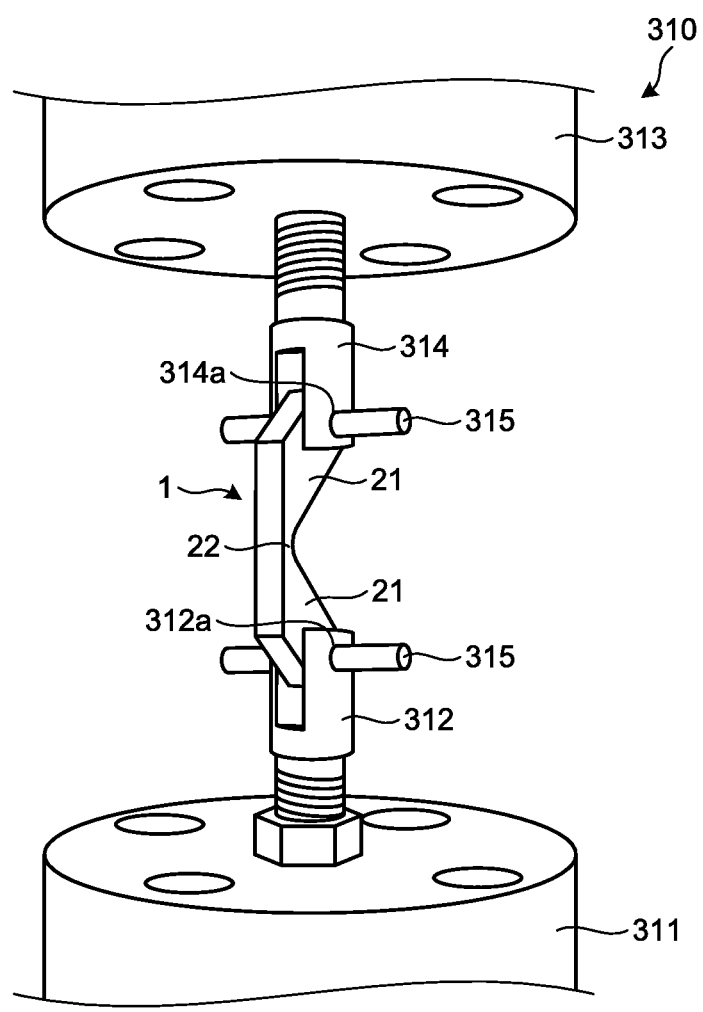
FIG. 3 is a schematic view illustrating an example of the configuration of a testing device that is used in a testing method of TBC according to the first embodiment.

The following describes the compression testing device 310 that executes a compression test of the test piece 1 with reference to FIG. 3. FIG. 3 is a schematic view illustrating an example of the configuration of the testing device that is used in a testing method of TBC according to the first embodiment. The compression testing device 310 includes a lower base 311, a lower holding unit 312 fixed to the lower base 311, an upper base 313, an upper holding unit 314 fixed to the upper base 313, and a pair of the pins 315. The pair of pins 315 are inserted into an insertion hole 312a formed on the lower holding unit 312 and into an insertion hole 314a formed on the upper holding unit 314. The pair of pins 315 are rotatably supported by the insertion hole 312a on the lower holding unit 312 and the insertion hole 314a on the upper holding unit 314. The pins 315 have strength to a degree that the pins 315 are not deformed when predetermined compression stress is applied to the test piece 1. In the present embodiment, the diameter of the pins 315 is about 5 mm. The pins 315 each have a length in an axis direction longer than a plate thickness of the test piece 1. The test piece 1 is attached to the compression testing device 310 through the pair of pins 315. The compression testing device 310 applies compression stress in a direction for bringing the pair of arm parts 21 close together to the test piece 1.

Figure 4:
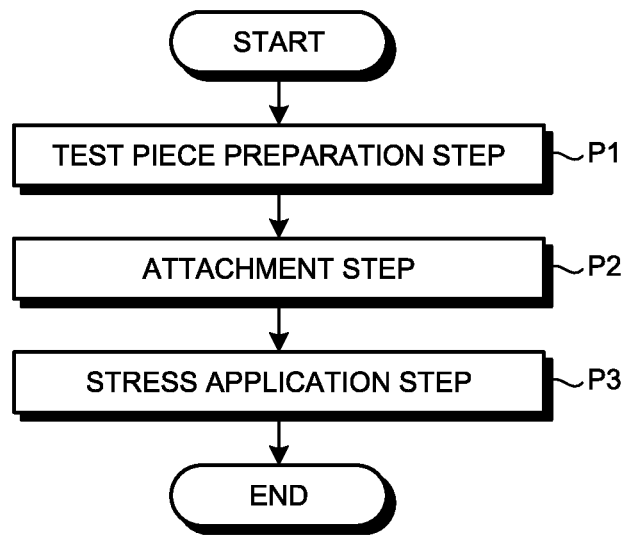
FIG. 4 is a flow illustrating an outline of the testing method of TBC.

The following describes a testing method of TBC using the test piece 1 with reference to FIG. 4. FIG. 4 is a flow illustrating an outline of the testing method of TBC. The testing method of TBC according to the present embodiment causes presence or absence of damage to TBC formed on a bending part on which compression stress acts to be evaluated. The testing method of TBC includes a test piece preparation step P1, an attachment step P2, and a stress application step P3. The following describes each of the steps P1 to P3 in detail.

At the test piece preparation step P1, the test piece 1 that includes the pair of arm parts 21, the bending part 22 arranged between the pair of arm parts 21, and the TBC layer 3 formed as a film on the inner periphery 2a of the main body part 2 is prepared. More specifically, the distance H between the center O1 of the pair of round holes 23 and the center O2 of the curvature radius R of the bending part 22 is calculated based on the curvature radius R, the thickness hc of the TBC layer 3, and the thickness hs of the bending part 22. Based on the distance H, the other dimension of the main body part 2 is calculated. Based on the calculated dimension, the main body part 2 is cut out of a material ingot. Based on the calculated dimension, the pair of round holes 23 are formed by passing through the front end portions 212 of the pair of arm parts 21 in a plate thickness direction. In the same way as a real machine, the TBC layer 3 is formed on the inner periphery 2a of the cutout main body part 2. In this manner, the test piece 1 is created at the test piece preparation step P1.

At the test piece preparation step P1, it is preferable that the curvature radius R of the bending part 22 together with a curvature radius of the bending part 104 of the turbine blade 100 of a gas turbine be made within a range from 3 mm or more to 7 mm or less. In the present embodiment, the curvature radius R of the bending part 22 is set at 6 mm. It is preferable that the thickness hs of the bending part 22 together with a thickness of the bending part 104 of the turbine blade 100 of a gas turbine be made within a range from 3 mm or more to 7 mm or less. In the present embodiment, the thickness hs of the bending part 22 is set at 3 mm. It is preferable that the thickness hc of the TBC layer 3 together with a thickness of a TBC layer of the turbine blade 100 of a gas turbine be made within a range from 0.3 mm or more to 1.5 mm or less. In the present embodiment, the thickness hc of the TBC layer 3 is set at 1.5 mm.

At the attachment step P2, the test piece 1 is attached to the compression testing device 310 after the test piece preparation step P1. More specifically, the pair of pins 315 are inserted into the pair of round holes 23 of the test piece 1, and the test piece 1 is attached to the compression testing device 310. The pair of pins 315 are rotatable with respect to the lower holding unit 312 and the upper holding unit 314, and are rotatable with respect to the pair of round holes 23 of the test piece 1. In this manner, the test piece 1 is attached to the compression testing device 310 so as to reduce influence of a bending moment in the test piece 1 to a negligible degree at the stress application step P3.

At the stress application step P3, the compression testing device 310 applies compression stress in a direction for bringing the pair of arm parts 21 close together to the test piece 1 through the pair of pins 315 after the attachment step P2. At the stress application step P3, a load is applied to the TBC layer 3 in a direction where compression stress acts in the same way as a stress field of a real machine. More specifically, a strain gauge 320 is attached to the bending part 31 of the TBC layer 3 in the test piece 1. The strain gauge 320 is, for example, a differential transformer type extensometer. The compression testing device 310 applies compression stress to the test piece 1. The strain gauge 320 measures a strain of the bending part 31 of the TBC layer 3 in the test piece 1. The strain gauge 320 outputs a measurement result to a control device, which is not illustrated, and stores the measurement result in a storage device. The control device displays a measurement result of the strain gauge 320 on a display device. On the display device, for example, a measurement result is displayed as a graph illustrated in FIG. 5.

Figure 5:
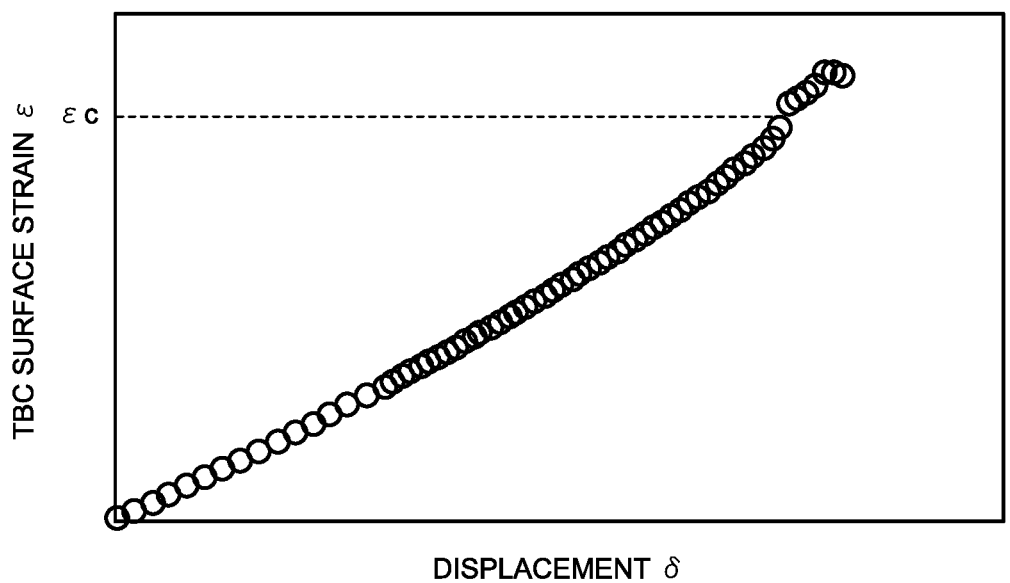
FIG. 5 is a graph illustrating an example of a measurement result of a strain gauge.

A measurement result of the strain gauge 320 is described with reference to FIG. 5. FIG. 5 is a graph illustrating an example of a measurement result of the strain gauge. In the graph, a horizontal axis is used as the displacement δ and a vertical axis is used as the TBC layer surface strain ε. The TBC layer surface strain ε generates discontinuous points when damage occurs. In this graph, when compression stress is applied, the TBC layer surface strain ε increases along with an increase of the displacement δ. When the TBC layer surface strain ε is εc, the TBC layer surface strain ε is discontinuous. Thus, it is assumed that the TBC layer 3 is damaged when the TBC layer surface strain ε is εC. In the example illustrated in FIG. 5, the TBC layer surface strain ε in which damage occurs is referred to as the damage limit strain εc.

As described above, according to the present embodiment, the TBC layer 3 is formed, in the same way as a real machine, on the inner periphery 2a of the main body part 2 in the test piece 1 that imitates the bending part 104 including a range where high compression stress acts in the turbine blade 100 of a gas turbine. In the same way as a stress field of a real machine, a load is applied to the TBC layer 3 in a direction where compression stress acts, and a strain of the bending part 31 of the TBC layer 3 is measured. In this manner, in the present embodiment, presence or absence of damage to the bending part 31 of the TBC layer 3 can be accurately evaluated. Because the test piece 1 imitates the bending part 104 including a range where high compression stress acts in the turbine blade 100 of a gas turbine, in the present embodiment, presence or absence of damage to TBC formed on the bending part 104 of the turbine blade 100 of a gas turbine can be accurately evaluated.

According to the present embodiment, presence or absence of damage to TBC in a real machine can be accurately evaluated by accurately evaluating presence or absence of damage to the bending part 31 of the TBC layer 3 in the test piece 1.

Figure 7:
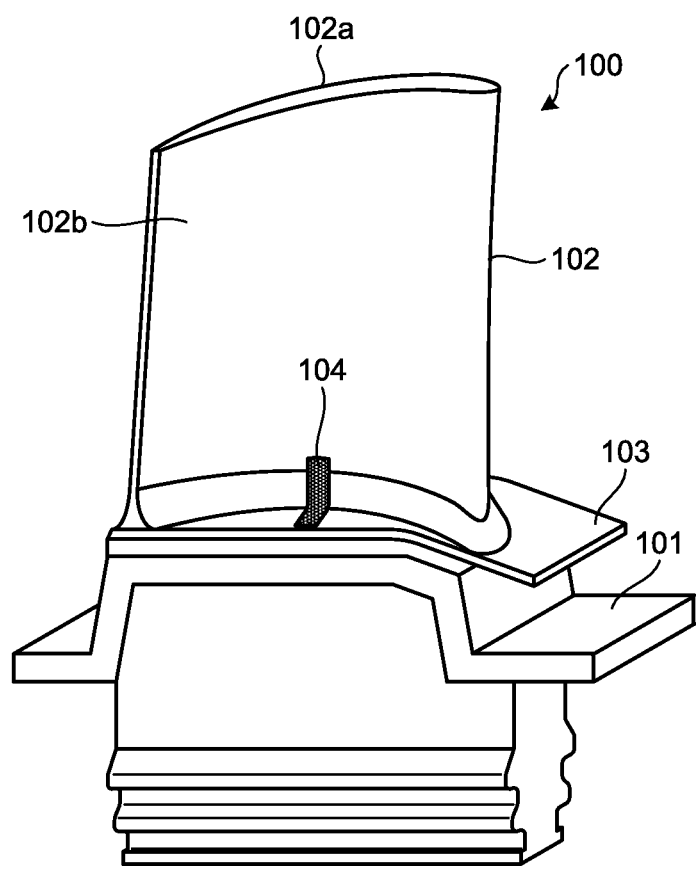
FIG. 7 is a perspective view illustrating an example of a turbine blade to which TBC is applied and that includes a bending part on which compression stress acts.
Figure 8:
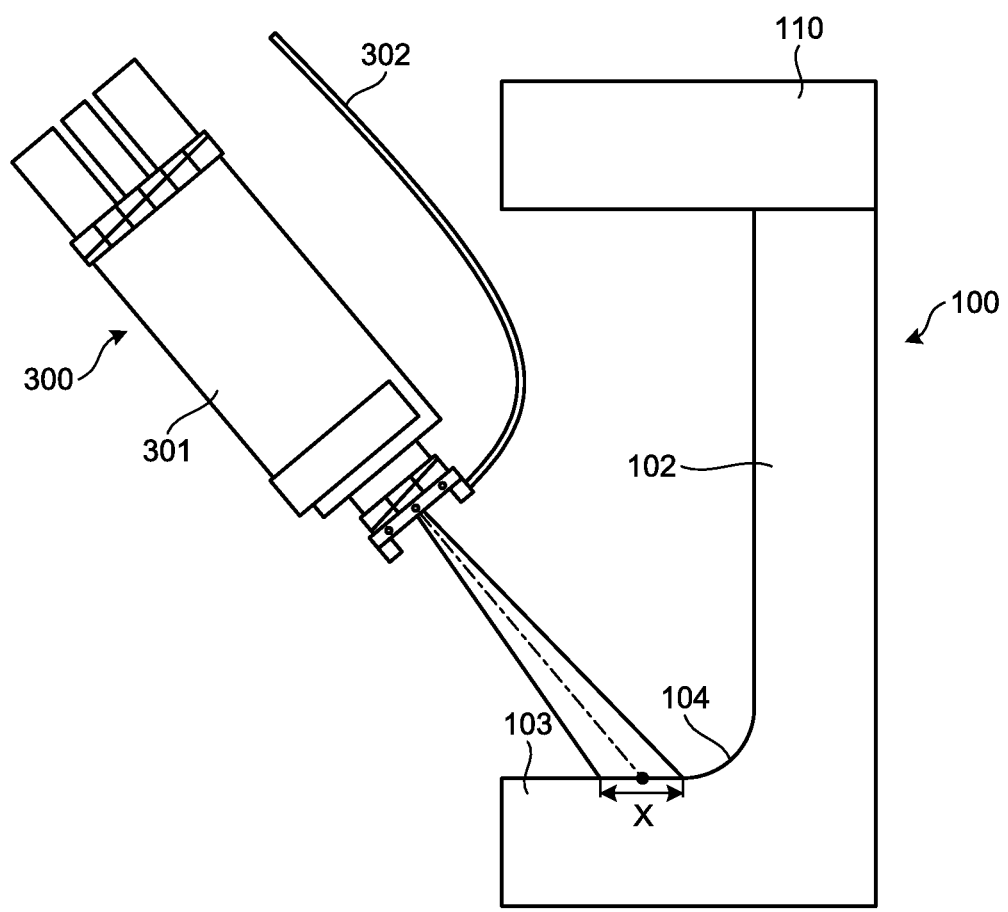
FIG. 8 is a schematic view illustrating a state in which TBC is applied to the turbine blade illustrated in FIG. 7.

Furthermore, application of TBC to the bending part 104 is more difficult than application of TBC to any other parts, and it is difficult for the bending part 104 to keep quality of TBC uniform. Application of TBC to the bending part 104 is described with reference to FIG. 8. FIG. 7 is a perspective view illustrating an example of the turbine blade to which TBC is applied and that includes the bending part on which compression stress acts. FIG. 8 is a schematic view illustrating a state in which TBC is applied to the turbine blade illustrated in FIG. 7. As illustrated in FIG. 8, the turbine blade 100 is arranged between a platform 103 and a masking jig 110. When a thermal spraying device 300 applies thermal spraying to the periphery of the bending part 104, the thermal spraying device 300 executes application in an obliquely inclined state with respect to the platform 103 so that a main body part 301 and a supply pipe 302 do not interfere with the masking jig 110. As compared with a case where the thermal spraying device 300 executes application in an upright state with respect to an execution unit, a beam diameter X of the thermal spraying device 300 is expanded. In this manner, a TBC agent is unlikely to be attached to the bending part 104. If the number of paths of thermal spraying increases so that a TBC layer has a predetermined thickness, a thickness of the periphery of the bending part 104 may be thicker than those of any other parts. Because application to bending parts of a blade of a gas turbine and a member of a combustor is difficult in this manner, properly evaluating quality of a TBC layer is required.

According to the present embodiment, presence or absence of damage to TBC formed on the bending part 104 of the turbine blade 100 of a gas turbine can be accurately evaluated by accurately evaluating presence or absence of damage to the bending part 31 of the TBC layer 3 in the test piece 1.

By contrast, the conventional method is described. As illustrated in FIGS. 9 to 11, a load is applied to, in a direction perpendicular to an axis direction or a direction along the axis direction, a test piece 120 that is obtained from the blade part 102 in the turbine blade 100 of a gas turbine and extends in the axis direction. FIG. 9 is a schematic view illustrating the conventional test piece. FIG. 10 is a schematic view illustrating the conventional test piece. FIG. 11 is a schematic view illustrating the conventional testing method. Conventionally, a strain is measured on not the bending part 104 (see FIG. 7) on which high compression stress acts in the turbine blade 100 of a gas turbine but the test piece 120 that extends in an axis direction. Thus, in the conventional method, presence or absence of damage cannot be evaluated with a shape of the bending part 104 where high compression stress acts on the TBC layer 3.

According to the present embodiment, presence or absence of damage to the bending part 31 of the TBC layer 3 can be more accurately evaluated because compression stress is applied to the bending part 31 of the TBC layer 3 in the test piece 1.

In this manner, the present embodiment enables presence or absence of damage to TBC formed on the bending part 104 on which high compression stress acts in the turbine blade 100 of a gas turbine to be accurately evaluated by evaluating presence or absence of damage to the bending part 31 of the TBC layer 3 in the test piece 1.

Second Embodiment

Figure 6:
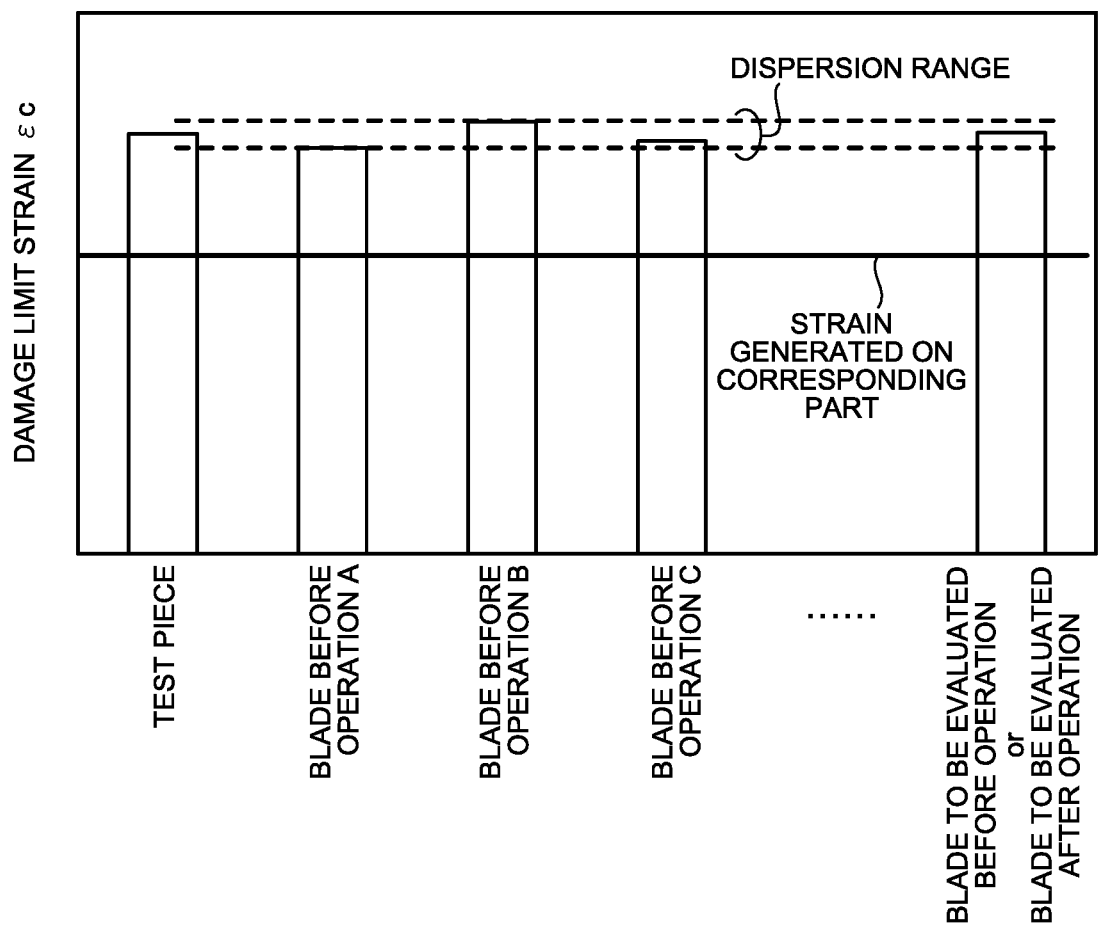
FIG. 6 is a graph illustrating an evaluation result of the test piece according to a second embodiment.

The following describes a testing method of TBC according to the present embodiment with reference to FIG. 6. FIG. 6 is a graph illustrating an evaluation result of the test piece according to a second embodiment. In the present embodiment, in order to avoid overlapped description, a part different from that in the first embodiment is described, and a part having the same configuration as that in the first embodiment is described by assigning like reference signs or corresponding reference signs.

At the test piece preparation step P1, the test piece 1 is created by cutting the test piece 1 out of the turbine blade 100 of a gas turbine serving as a real machine. More specifically, at the test piece preparation step P1, the test piece 1 is cut out so that the test piece 1 includes the bending part 104 of the turbine blade 100 and the distance H between the center O1 of the pair of round holes 23 and the center O2 of the curvature radius R is a value calculated based on the curvature radius R of the bending part 22, the thickness hc of the TBC layer 3, and the thickness hs of the bending part 22. Based on the calculated dimension, the pair of round holes 23 are formed on the front end portions 212 of the pair of arm parts 21 in the cutout test piece 1.

At the test piece preparation step P1, the test piece 1 may be cut out of the turbine blade 100 of a gas turbine before operation or after operation. More specifically, when presence or absence of damage to TBC of the turbine blade 100 of a gas turbine before operation is desired to be evaluated, the test piece 1 may be cut out of the turbine blade 100 of a gas turbine before operation. When presence or absence of damage to TBC of the turbine blade 100 of a gas turbine after operation is desired to be evaluated, the test piece 1 may be cut out of the turbine blade 100 of a gas turbine after operation.

The attachment step P2 and the stress application step P3 are implemented in the same way as in the first embodiment.

An evaluation method of the present embodiment is described with reference to FIG. 6. In the present embodiment, presence or absence of damage to TBC of the turbine blade 100 of a gas turbine before operation is evaluated. The graph illustrates the damage limit strain εC for each test piece 1 cut out of the turbine blade 100 of a gas turbine before operation. A solid line indicates a strain generated on the corresponding part that is calculated about the bending part 104 of the turbine blade 100 of a gas turbine with FEM calculation. A broken line indicates an allowable range of a strain, in other words, a dispersion range. The graph shows that a blade to be evaluated has the damage limit strain εc within the dispersion range and has a limit value higher than the solid-line strain generated on the corresponding part. Thus, it can be determined that a blade to be evaluated has no problem with quality. The turbine blade to be evaluated that is determined in this manner does not need any repair.

As described above, according to the present embodiment, the test piece 1 is cut out of the turbine blade 100 of a gas turbine before operation or after operation, and strength of TBC formed on the turbine blade 100 of the gas turbine is measured. The present embodiment enables presence or absence of damage to TBC formed on the turbine blade 100 of a gas turbine to be accurately evaluated. Thus, the present embodiment can improve the accuracy of quality control for the turbine blade 100 of a gas turbine. In addition, the present embodiment can further improve the accuracy of degradation diagnosis for the turbine blade 100 of a gas turbine.

The test piece 1 is described as an imitation of the turbine blade 100 of a gas turbine, but this is not limiting. The test piece 1 can be applied to any other member to which TBC is applied and that includes a bending part on which compression stress acts, for example, a bending part of a combustor.

REFERENCE SIGNS LIST

1 Test piece
2 Main body part
2a Inner periphery
21 Arm part
22 Bending part
22a Bending surface
23 Round hole
3 TBC layer
31 Bending part
100 Turbine blade
102 Blade part
104 Bending part
h Distance (distance between center of round hole and center of curvature radius)
hc Thickness (thickness of tbc layer)
hs Thickness (thickness of bending part)
r Curvature radius

The invention claimed is:

1. A testing method of a thermal barrier coating (TBC) for evaluating a presence or absence of damage to the TBC formed on a bending part on which compression stress acts, the testing method comprising:

preparing a test piece that includes a pair of arm parts, a bending part arranged between the pair of arm parts, and the TBC layer on a bending surface of the bending part;

attaching the test piece to a compression testing device after preparing the test piece; and applying compression stress to the test piece in a direction for bringing the pair of arm parts close together after attaching the test piece with the compression testing device, wherein the pair of arm parts are arranged so as to separate from each other in a direction from base end portions toward front end portions of the arm parts, wherein the bending part is arranged between the base end portions, wherein preparing the test piece includes forming a pair of round holes passing through the arm parts in a plate thickness direction of the pair of arm parts, wherein attaching the test piece includes attaching the test piece to the compression testing device through pins inserted into the pair of round holes, wherein applying the compression stress includes applying compression stress to the test piece in a direction for bringing the pair of arm parts close together through the pins, and wherein when preparing the test piece, a curvature radius R of the bending part is made within a range of a value of a curvature radius of a second bending part in a real machine to be evaluated, a thickness hc of the TBC layer is made within a range of a value of a thickness of a second TBC layer in the real machine, a thickness hs of the bending part is made within a range of a value of a thickness of the second bending part in the real machine, and a distance H in a lateral direction between a center of the pair of round holes and a center of the curvature radius R is set at a value calculated based on the curvature radius R, the thickness hc, and the thickness hs.

2. The testing method of the TBC according to claim 1, wherein, when preparing the test piece, the curvature radius R is made within a range from 3 mm or more to 7 mm or less, the thickness hc is made within a range from 0.3 mm or more to 1.5 mm or less, and the thickness hs is made within a range from 3 mm or more to 7 mm or less.

3. The testing method of TBC according to claim 1, wherein a central axis of a curvature radius of the bending part extends in a direction perpendicular to a direction in which the compression stress is applied.

4. The testing method of the TBC according to claim 1, wherein preparing the test piece includes calculating other dimensions of the test piece based on the calculated distance H, cutting a portion having the calculated dimensions as a main body part out of an ingot to prepare the test piece before the pair of round holes is formed.

5. The testing method of TBC according to claim 1, wherein preparing the test piece includes calculating other dimensions of the test piece based on the calculated distance H, cutting a portion having the calculated dimensions as a main body part out of a turbine blade of a gas turbine to prepare the test piece before the pair of round holes is formed.

6. The testing method of TBC according to claim 5, wherein the turbine blade to be cut out at preparing the test piece is of the gas turbine before or after operation.

7. The testing method of TBC according to claim 5, further comprising calculating a damage limit strain for the test piece cut out of the gas turbine, and determining a quality of the turbine blade based on whether the calculated damage limit strain is within an allowable range.

8. A test piece that is used in a testing method of a thermal barrier coating (TBC) for evaluating a presence or absence of damage to the TBC formed on a bending part on which compression stress acts, the test piece comprising:
  a pair of arm parts;
  a bending part arranged between the pair of arm parts; and the TBC layer on a bending surface of the bending part,
  wherein the pair of arm parts are arranged so as to separate from each other in a direction from base end portions toward front end portions of the arm parts,
  wherein the bending part is arranged between the base end portions,
  wherein the pair of arm parts has a pair of round holes passing through the pair of arm parts in a plate thickness direction,
  wherein the test piece is to be attached to a compression testing device through pins inserted into the pair of round holes,
  wherein a curvature radius R of the bending part is made within a range of a value of a curvature radius of a second bending part in a real machine to be evaluated,
  wherein a thickness hc of the TBC layer is made within a range of a value of a thickness of a second TBC layer in the real machine,
  wherein a thickness hs of the bending part is made within a range of a value of a thickness of a second bending part in the real machine, and
  wherein a distance H in a lateral direction between a center of the pair of round holes and a center of the curvature radius R is set at a value that is calculated based on the curvature radius R, the thickness hc, and the thickness hs.

9. The test piece according to claim 8, wherein
  the curvature radius R is made within a range from 3 mm to 7 mm,
  the thickness hc is made within a range from 0.3 mm to 1.5 mm, and
  the thickness hs is made within a range from 3 mm to 7 mm.

10. The test piece according to claim 8, wherein a central axis of a curvature radius of the bending part extends in a direction perpendicular to a direction in which the compression stress is applied.

* * * * *